United States Patent
Raghavan et al.

(10) Patent No.: US 12,512,869 B2
(45) Date of Patent: Dec. 30, 2025

(54) OPTIMAL ANTENNA SWAP IMPLEMENTATIONS IN RF FRONT END MODULES FOR TDD BANDS

(71) Applicant: SKYWORKS SOLUTIONS, INC., Irvine, CA (US)

(72) Inventors: Anand Raghavan, Middleton, WI (US); David Richard Pehlke, Westlake Village, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 428 days.

(21) Appl. No.: 18/055,879

(22) Filed: Nov. 16, 2022

(65) Prior Publication Data

US 2023/0155622 A1    May 18, 2023

Related U.S. Application Data (60) Provisional application No. 63/280,843, filed on Nov. 18, 2021.

(51) Int. Cl.
| | |
|---|---|
| *H04B 1/40* | (2015.01) |
| *H01Q 21/30* | (2006.01) |
| *H03F 3/24* | (2006.01) |
| *H04L 5/14* | (2006.01) |

(52) U.S. Cl.
CPC ............... *H04B 1/40* (2013.01); *H01Q 21/30* (2013.01); *H03F 3/245* (2013.01); *H04L 5/14* (2013.01); *H03F 2200/171* (2013.01); *H03F 2200/294* (2013.01); *H03F 2200/451* (2013.01)

(58) Field of Classification Search
CPC .......... H04B 1/40; H01Q 21/30; H03F 3/245; H03F 2200/171; H03F 2200/294; H03F 2200/451; H04L 5/14
See application file for complete search history.

(56) References Cited

U.S. PATENT DOCUMENTS

| | | | |
|---|---|---|---|
| 10,477,550 B2 * | 11/2019 | Balteanu | H04L 5/1469 |
| 11,177,841 B2 * | 11/2021 | Ono | H04B 1/04 |
| 2020/0154434 A1 * | 5/2020 | Balteanu | H03F 1/565 |
| 2020/0381809 A1 * | 12/2020 | Parthasarathy | H01P 1/15 |

* cited by examiner

*Primary Examiner* — Chandrahas B Patel
(74) *Attorney, Agent, or Firm* — Lando & Anastasi, LLP (57) ABSTRACT

Aspects of the disclosure include a front-end module comprising one or more receive ports configured to be coupled to a transceiver, at least one low-noise amplifier configured to be coupled to the one or more receive ports, one or more antenna ports configured to be coupled to one or more respective antennas, and a multiplexer coupled to the one or more receive ports and to the one or more antenna ports, the multiplexer being configured to route a signal received at the one or more antenna ports to a selected receive port of the one or more receive ports.

20 Claims, 5 Drawing Sheets

OPTIMAL ANTENNA SWAP IMPLEMENTATIONS IN RF FRONT END MODULES FOR TDD BANDS

CROSS-REFERENCE TO RELATED APPLICATIONS

This application claims priority under 35 U.S.C. § 119(e) to U.S. Provisional Application Ser. No. 63/280,843, titled "OPTIMAL ANTENNA SWAP IMPLEMENTATIONS IN RF FRONT END MODULES FOR TDD BANDS," filed on Nov. 18, 2021, which is hereby incorporated by reference in its entirety.

BACKGROUND

1. Field of the Disclosure

At least one example in accordance with the present disclosure relates generally to front-end modules of wireless devices.

2. Discussion of Related Art

Wireless devices exchange wireless signals with other wireless devices. For example, a mobile handset may include one or more antennas to exchange wireless signals with a base station. The mobile handset may include a front-end module connected between the antenna(s) and a transceiver. The front-end module may route signals to an intended destination between the antenna(s) and the transceiver.

SUMMARY

According to at least one aspect of the present disclosure, a front-end module includes one or more receive ports configured to be coupled to a transceiver, at least one low-noise amplifier configured to be coupled to the one or more receive ports, one or more antenna ports configured to be coupled to one or more respective antennas, and a multiplexer coupled to the one or more receive ports and to the one or more antenna ports, the multiplexer being configured to route a signal received at the one or more antenna ports to a selected receive port of the one or more receive ports.

In some examples, the front-end module is configured to operate in one or more of a time-division duplexing mode of operation or a frequency-division duplexing mode of operation. In various examples, the multiplexer is coupled to an output of the at least one low-noise amplifier. In at least one example, the multiplexer coupled to the output of the at least one low-noise amplifier reduces an insertion loss, reduces a noise figure, and improves receive sensitivity. In some examples, the front-end module further comprises a common filter switchably coupled to a transmit path and to a receive path. In various examples, the front-end module further comprises a first filter coupled to a transmit path and a second filter coupled to a receive path. In at least one example, the front-end module further comprises at least one remote-module receive port configured to be coupled to a remote module and configured to receive one or more signals from the remote module, wherein the multiplexer is further configured to route the one or more signals from the at least one remote-module receive port to the one or more receive ports coupled to the transceiver.

According to at least one aspect of the disclosed, a front-end module is provided including one or more receive ports configured to be coupled to a transceiver, at least one low-noise amplifier configured to be coupled to the one or more receive ports, one or more antenna ports configured to be coupled to one or more respective antennas, and a multiplexer coupled to the one or more receive ports and to the one or more antenna ports, the multiplexer being configured to route a signal received at the one or more antenna ports to a selected receive port of the one or more receive ports.

In some examples, the front-end module is configured to operate in one or more of a time-division duplexing mode of operation or a frequency-division duplexing mode of operation. In at least one example, the multiplexer is coupled to an output of the at least one low-noise amplifier. In various examples, a number of receive ports of the one or more receive ports is greater than a number of low-noise amplifiers of the at least one low-noise amplifier. In some examples, the at least one low-noise amplifier includes a plurality of low-noise amplifiers. In at least one example, the at least one low-noise amplifier includes a plurality of low-noise amplifiers, the front-end module further comprising a plurality of filters each corresponding to a respective low-noise amplifier of the plurality of low-noise amplifiers.

In various examples, the front-end module includes a common filter switchably coupled to a transmit path and to a receive path. In some examples, the transmit path includes a power amplifier coupled to the common filter. In at least one example, the receive path includes the at least one low-noise amplifier coupled to the common filter. In various examples, the front-end module includes a receive filter, the at least one low-noise amplifier includes a first low-noise amplifier and a second low-noise amplifier, the first low-noise amplifier being coupled to the common filter and the second low-noise amplifier being coupled to the receive filter. In some examples, the front-end module includes a first filter coupled to a transmit path and a second filter coupled to a receive path.

In at least one example, the front-end module includes at least one remote-module receive port configured to be coupled to a remote module and configured to receive one or more signals from the remote module, the multiplexer being further configured to route the one or more signals from the at least one remote-module receive port to the one or more receive ports coupled to the transceiver. In various examples, at least one of the one or more receive ports is coupled to a remote module, and the multiplexer is further configured to route one or more signals from the at least one receive port to the remote module. In some examples, the front-end module includes the remote module, the remote module being further configured to provide the one or more signals to the transceiver.

According to at least one aspect of the disclosure, a method of operating an amplifier module having one or more receive ports, one or more antenna ports, an antenna switch module, and a multiplexer is provided, the method including receiving one or more receive signals at the one or more antenna ports, routing, by the antenna switch module, the one or more receive signals to the multiplexer via a receive path, and routing, by the multiplexer, the one or more receive signals to a selected receive port of the one or more receive ports.

In some examples, the amplifier module includes one or more transmit ports and a power amplifier, and the method includes receiving one or more transmit signals at the one or more transmit ports, providing the one or more transmit signals to the power amplifier, providing, by the power amplifier, the one or more transmit signals to the antenna switch module via a transmit path, the transmit path being different than the receive path. In various examples, the method includes routing, by the antenna switch module, a first receive signal to the multiplexer via a first receive path, and routing, by the antenna switch module, a second receive signal to the multiplexer via a second receive path, the first receive path and the second receive path being different than each other and the transmit path.

In at least one example, the method includes receiving, at a first receive port of the one or more receive ports, a receive signal from a remote module, and routing, by the multiplexer, the receive signal to a transceiver via a second receive port of the one or more receive ports. In some examples, the method includes receiving a first receive signal at the one or more antenna ports, routing, by the antenna switch module, the first receive signal to the multiplexer, and routing, by the multiplexer, the first receive signal to a remote module via a selected receive port of the one or more receive ports. In various examples, the method includes receiving, by the remote module, the first receive signal, and providing, by the remote module, the first receive signal to a transceiver.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, a wireless device may include one or more antennas to transmit and receive wireless signals. The wireless device may include a front-end module (FEM) to route signals between the antennas and a transceiver. For example, the FEM may include an antenna switch module (ASM) configured to route transmit signals from the transceiver to the best antenna out of several antennas. The antenna that is considered the "best" antenna for transmitting may change dynamically as operating conditions change, such as due to loading conditions in the near field.

In some wireless-device systems, it may be advantageous (or, in some examples, required) for a primary receive mapping (that is, a mapping from a primary antenna to the baseband system in a receive path) to be the same as a transmit mapping (that is, a mapping from the baseband system to the primary antenna in a transmit path). However, in time-division duplexing (TDD) bands, receive signals may not be directly coupled to a transmitter and may have independent routing. In various examples, the ASM may be configured to route signals such that the primary receive mapping is the same as the transmit mapping. For example, the ASM may be configured to couple the same antenna that is used to transmit a signal in a preceding TDD time slot to a desired low-noise amplifier (LNA) in a subsequent time slot. In another example, additional antenna-swap switches may be implemented between the ASM and the antennas to route transmit and/or receive signals as desired.

However, re-configuring the ASM and/or adding additional antenna-swap switches between the ASM and the antennas to route receive signals in addition to transmit signals may adversely impact transmit and receive insertion-loss performance. Furthermore, the size and cost of the ASM may increase disproportionately to the requirements of receive-signal paths. Because the ASM may be sized to handle transmit signals, which may be of a higher power than receive signals, the additional ASM or antenna-swap-switch connections used to route receive signals may be lossy and impose additional losses on all associated paths of the ASM, and add larger and more costly die area to handle receive signals. Accordingly, modifications to the ASM to preserve signal mappings may disadvantageously increase cost and size while decreasing performance.

In another example, the ASM may be configured to route transmit signals from an input port to a desired antenna, but may not be configured to route receive signals from an antenna to a desired output port. Rather, a multiplexer (MUX) may be implemented between the ASM and the output ports to route receive signals. At least because the MUX does not conduct transmit signals, the MUX may be less costly and smaller than the modified ASM discussed above since the MUX is rated for lower-power receive signals. Moreover, transmit performance may be affected minimally or not at all by the MUX because the MUX is not implemented in a transmit path. In addition, by configuring the placement of the MUX in the receive path, it may be possible to reduce or avoid degrading the receiver performance as compared to configurations in which the ASM is modified to accommodate signal routing. Performance may be improved at least in part because any losses induced by the MUX are implemented after the LNA, such that the losses are not amplified by the LNA. Accordingly, a noise figure may be dictated by the LNA, and losses following the LNA may be significantly reduced in a near-field by the gain of the LNA, thereby saving approximately 0.8 to 2.8 dB in the swapped receive traces.

The circuits disclosed herein can be included in wireless communication devices, such as mobile devices. One or more circuits in accordance with any suitable principles and advantages disclosed herein can be implemented in any suitable wireless communication device. An example of such a wireless communication device will be discussed with reference to FIG. 1.

Figure 1:
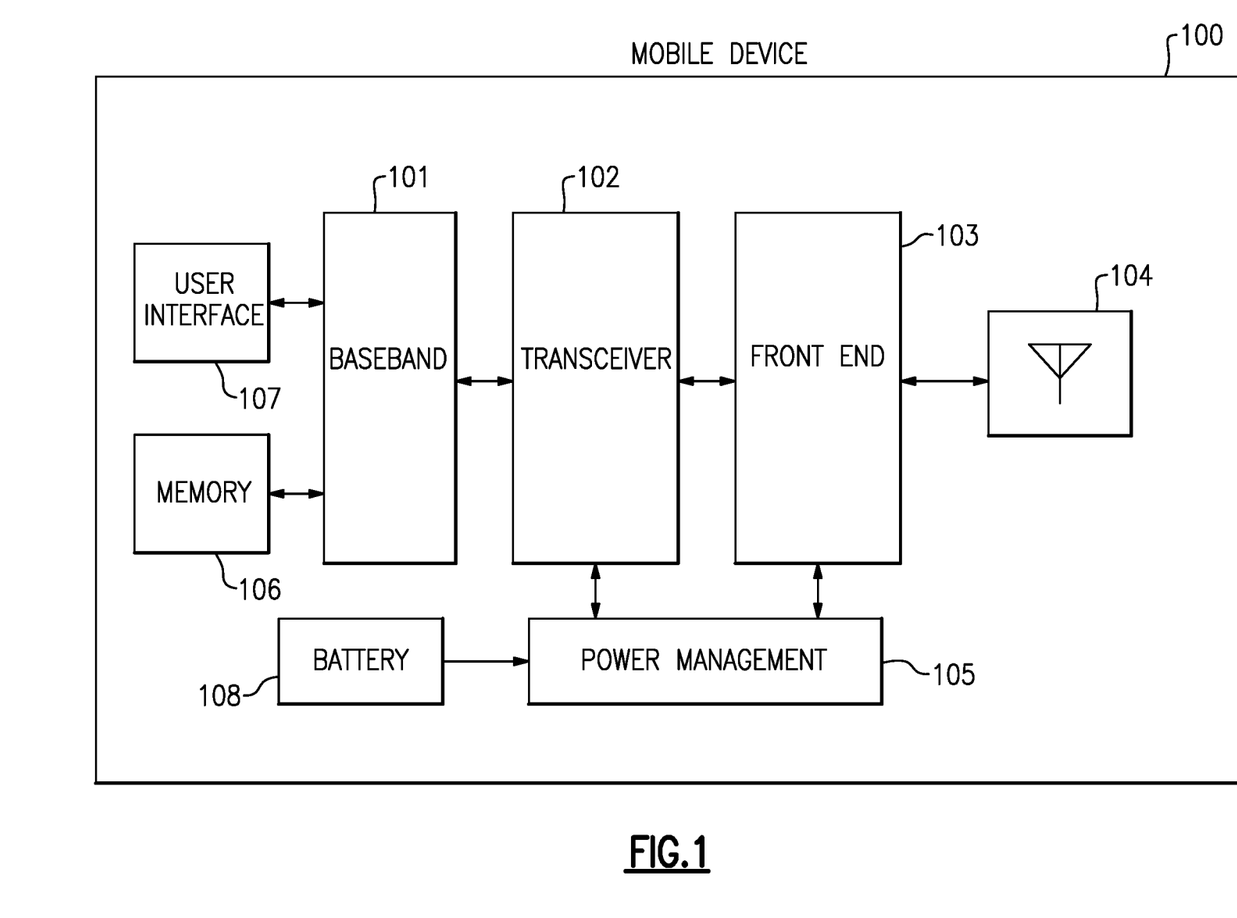
FIG. 1 illustrates a block diagram of a mobile device according to an example.

FIG. 1 is a schematic diagram of one example of a mobile device 100. The mobile device 100 includes a baseband system 101, a transceiver 102, a front-end module (FEM) 103, antennas 104, a power-management system 105, a memory 106, a user interface 107, and a battery 108.

The mobile device 100 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 102 generates radio-frequency (RF) signals for transmission by the antennas 104 and processes incoming RF signals received by the antennas 104. It will be understood that various functionalities associated with the transmission and receiving of RF signals can be achieved by one or more components that are collectively represented in FIG. 1 as the transceiver 102. In one example, separate components (for instance, separate circuits or dies) can be provided for handling certain types of RF signals.

As discussed above, the FEM 103 aids in conditioning signals transmitted to and/or received from the antennas 104. For example, the FEM may include antenna-tuning circuitry, power amplifiers (PAs), LNAs, ASMs, MUXs, filters, switches, signal-splitting and/or -combining circuitry, and so forth. However, other implementations are possible. The FEM can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), switching a connection of a selected antenna to a desired receive or transmit port, or some combination thereof.

In certain implementations, the mobile device 100 supports carrier aggregation, thereby providing flexibility to increase peak data rates. Carrier aggregation can be used for both frequency-division duplexing (FDD) and TDD, and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 104 can include antennas used for a wide variety of types of communications. For example, the antennas 104 can include antennas for transmitting and/or receiving signals associated with a wide variety of frequencies and communications standards.

In certain implementations, the antennas 104 support multiple-input, multiple output (MIMO) communications and/or switched diversity communications. For example, MIMO communications use multiple antennas for communicating multiple data streams over a single RF channel. MIMO communications benefit from higher signal-to-noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit-error rate and/or a signal-strength indicator.

The mobile device 100 can operate with beamforming in certain implementations. For example, the FEM 103 can include amplifiers having controllable gain and phase shifters having controllable phase to provide beam formation and directivity for transmission and/or reception of signals using the antennas 104. For example, in the context of signal transmission, the amplitude and phases of the transmit signals provided to the antennas 104 are controlled such that radiated signals from the antennas 104 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 104 from a particular direction. In certain implementations, the antennas 104 include one or more arrays of antenna elements to enhance beamforming.

The baseband system 101 is coupled to the user interface 107 to facilitate processing of various user input and output, such as voice and data. The baseband system 101 provides the transceiver 102 with digital representations of transmit signals, which the transceiver 102 processes to generate RF signals for transmission. The baseband system 101 also processes digital representations of received signals provided by the transceiver 102. As shown in FIG. 1, the baseband system 101 is coupled to the memory 106 of facilitate operation of the mobile device 100.

The memory 106 can be used for a wide variety of purposes, such as storing data and/or instructions to facilitate the operation of the mobile device 100 and/or to provide storage of user information.

The power-management system 105 provides a number of power-management functions of the mobile device 100. In certain implementations, the power-management system 105 includes a PA supply control circuit that controls the supply voltages of PAs. For example, the power-management system 105 can be configured to change the supply voltage(s) provided to one or more of the PAs to improve efficiency, such as power-added efficiency.

As shown in FIG. 1, the power management system 105 receives a battery voltage from the battery 108. The battery 108 can be any suitable battery for use in the mobile device 100, such as a lithium-ion battery.

Figure 2:
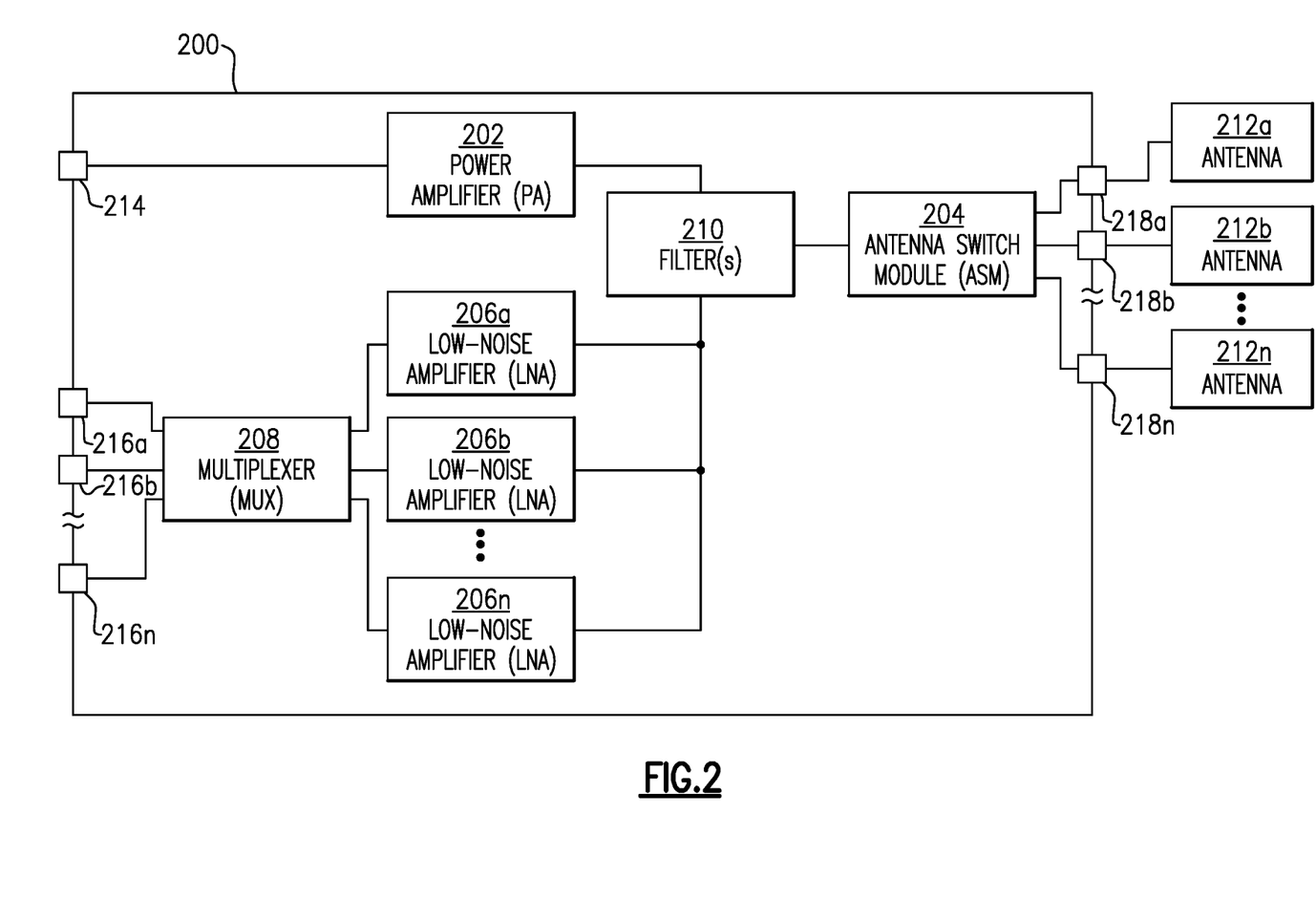
FIG. 2 illustrates a block diagram of a power-amplifier (PA) module according to an example.

FIG. 2 illustrates a block diagram of a PA module 200 according to an example. The PA module 200 may be a module of the FEM 103 in some examples. The PA module 200 includes a PA 202, an ASM 204, an arbitrary number of LNAs 206, a MUX 208, and one or more filters 210. Aspects of the PA module 200 may be omitted for purposes of illustrative clarity. For example, the PA module 200 may alternately or additionally include one or more directional couplers, digital control circuitry, decoding circuitry, and so forth, which are not illustrated for purposes of clarity. Additionally, in some examples the PA module 200 may include different configurations of the illustrated components. For example, the PA module 200 may include multiple PAs in addition to or in lieu of the PA 202 in some examples. In some examples, the PA module 200 may alternately be referred to as an "amplifier module" at least in view of the fact that the PA module 200 includes LNAs 206 in addition to the PA 202; accordingly, no limitation on the LNAs 206 is implied by using the term "PA module."

The PA module 200 may be coupled to an arbitrary number of antennas 212a, 212b, 212n (collectively, "antennas 212"), which may be examples of the antennas 104. The PA module 200 further includes a transmit port 214 configured to be coupled to a transceiver (for example, the transceiver 102), an arbitrary number of receive ports 216a, 216b, 216n (collectively, "receive ports 216") configured to be coupled to the transceiver, and an arbitrary number of antenna ports 218a, 218b, 218n (collectively, "antenna ports 218") configured to be coupled to the antennas 212. For example, each of the antenna ports 218 may be coupled to a respective one of the antennas 212. In various examples, connections that are illustrated as overlapping (that is, common and shared) in FIG. 2 may not represent common signal paths, and may instead be presented as such for illustrative convenience only. For example, although a connection between the LNA 206a and the one or more filters 210 is illustrated as being partially shared with a connection between the LNA 206b and the one or more filters 210, in an actual implementation there may be no overlap between the two signal paths.

The transmit port 214 is coupled to the PA 202 and is configured to be coupled to a transceiver, such as the transceiver 102. The PA 202 is coupled to the transmit port 214 at a first connection and to the one or more filters 210 at a second connection. In some examples, the PA 202 is coupled to fewer than all of the filters 210. The one or more filters 210 are coupled to the PA 202 at a first connection, to the LNAs 206 at a second connection, and to the ASM 204 at a third connection. In some examples, a first subset of the one or more filters 210 is coupled to the PA 202 and not to the LNAs 206, and a second subset of the one or more filters 210 is coupled to the LNAs 206 and not to the PA 202.

The ASM 204 is coupled to the one or more filters 210 at a first connection, and is coupled to the antenna ports 218 at a second connection. The antenna ports 218 are coupled to the ASM 204 and are configured to be coupled to respective antennas of the antennas 212. Each of the LNAs 206 is coupled to the one or more filters 210 at a respective first connection and is coupled to the MUX 208 at a respective second connection. The MUX 208 is coupled to the LNAs 206 at one or more first connections and is coupled to the receive ports 216 at one or more second connections. The receive ports 216 are coupled to the MUX 208 and are configured to be coupled to the transceiver. In some examples, the receive ports 216 may be coupled to corresponding receive ports on similar or identical PA modules.

The PA module 200 is configured to operate in a transmit mode and/or a receive mode. In a transmit mode, the PA module 200 is configured to transmit, via one or more of the antennas 212, a transmit signal received at the transmit port 214 from the transceiver 102. The transmit signal is provided to the PA 202, which amplifies the transmit signal and provides the amplified transmit signal to the ASM 204. The ASM 204 routes the amplified transmit signal to a desired antenna of the antennas 212 via a respective antenna port of the antenna ports 218. As discussed above, an antenna may be selected for transmitting a signal based on a variety of factors, such as an observed bit-error rate and/or a signal-strength indicator, or by means of detecting near-field loading conditions at the antenna. The selected antenna outputs the transmit signal as a wireless signal.

In a receive mode, the PA module 200 is configured to receive a receive signal at a respective antenna port of the antenna ports 218 from an antenna of the antennas 212. The receive signal is provided to the ASM 204. The ASM 204 routes the signal to one of the one or more filters 210. In some examples, multiple filter paths are provided, and the ASM 204 provides the signal to a desired filter path. The one or more filters 210 provide the signal to the one or more of the LNAs 206. In some examples, each filter path is coupled to a respective LNA, and the desired filter path provides the signal to a selected LNA. The selected LNA of the LNAs 206 provide the signal to the MUX 208. The MUX 208 routes the signal to a desired receive port. For example, the MUX 208 may be configured to be capable of coupling any of the LNAs 206 to any of the receive ports 216. The selected receive port provides the signal to the transceiver 102 and/or to a corresponding PA module as desired. For example, the first receive port 216a and the second receive port 216b may be coupled to the transceiver 102, and the third receive port 216n may be coupled to a corresponding PA module.

The MUX 208 is therefore configured to route a received signal to a desired one or more of the receive ports 216 by switchably connecting one or more of the LNAs 206 to the desired one or more of the receive ports 216 at an output of the one or more of the LNAs 206. Accordingly, although the ASM 204 may be configured to route a transmit signal to any of the antennas 212, the ASM 204 need not route a receive signal from an antenna to any particular receive port. An antenna-to-LNA mapping may therefore be maintained regardless of how a transmit signal is routed (for example, during a transmit time slot in the context of TDD). The MUX 208 enables the output of the LNAs 206 to be output to any desired receive port of the receive ports 216 (for example, of the transceiver radio-frequency integrated circuit [RFIC]), which allows a mapping between a primary receive antenna and a primary receive port to be maintained regardless of how the transmitted signal is swapped between antennas 212 for the PA module 200. Because the MUX 208 is implemented after the LNAs 206 in the receive path, insertion loss associated with antenna-swap-switching functionality that might otherwise be implemented before the LNAs 206 can be avoided. In addition, cross-UE-route insertion loss incurred on RF paths being swapped is reduced as compared to pre-LNA-switching solutions. Accordingly, performance degradation may be minimized and parasitic loading on the PA 202 is avoided.

Figure 3:
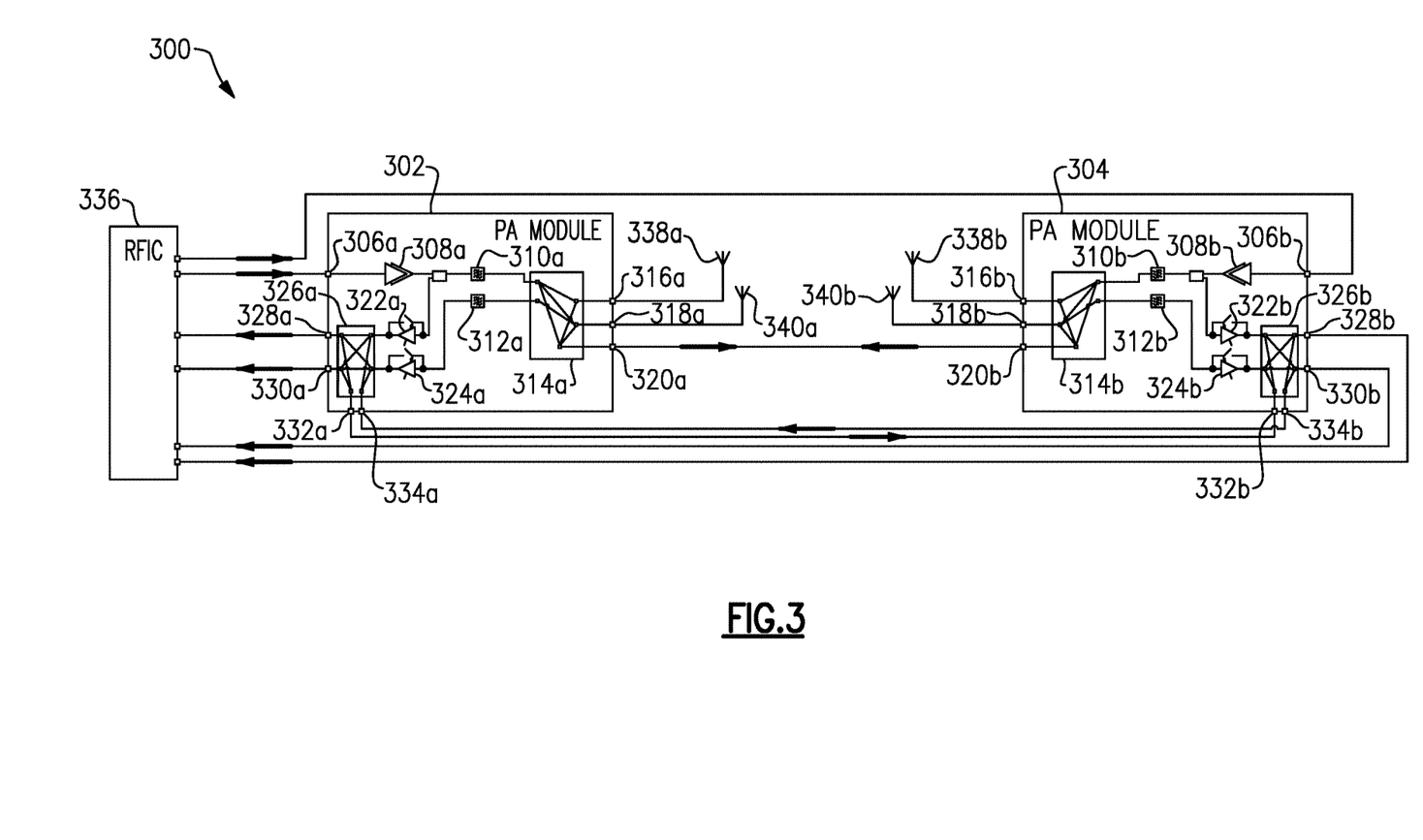
FIG. 3 illustrates a block diagram of a PA-module system according to an example.

Multiple implementations of the PA module 200 are within the scope of the disclosure. FIG. 3 illustrates a block diagram of a PA-module system 300 according to an example. The PA-module system 300 includes a first PA module 302 and a second PA module 304 configured in a two-transmit, four-receive (2T4R) configuration. The PA modules 302, 304 may be substantially similar or identical to one another, and may be examples of the PA module 200 of FIG. 2.

The PA modules 302, 304 include a transmit port 306a, 306b, a PA 308a, 308b, a first filter 310a, 310b, a second filter 312a, 312b, an ASM 314a, 314b, a first antenna port 316a, 316b, a second antenna port 318a, 318b, a sounding reference signal (SRS) port 320a, 320b, a first LNA 322a, 322b, a second LNA 324a, 324b, a MUX 326a, 326b, a first receive port 328a, 328b, a second receive port 330a, 330b, a third receive port 332a, 332b, and a fourth receive port 334a, 334b, respectively. In various examples, each of the PAs 308a, 308b may include multiple gain stages. In various examples, each of the LNAs 322, 324 is coupled in parallel with a bypass switch to enable a switch to bypass the respective LNAs 322, 324 to avoid being amplified by the respective LNAs 322, 324.

Each respective transmit port 306 is coupled to the respective PA 308, and is configured to be coupled to a transceiver 336. Each respective PA 308 is coupled to the respective transmit port 306 at an input and is switchably coupled to the respective first filter 310 at an output. Each respective first filter 310 is coupled to the respective ASM 314, and is switchably coupled to the respective PA 308 and the respective first LNA 322. Each respective ASM 314 is coupled to the respective first filter 310, the respective second filter 312, the respective first antenna port 316, the respective second antenna port 318, and the respective SRS port 320. Each respective first antenna port 316 is coupled to the respective ASM 314, and is configured to be coupled to a respective first antenna 338 of first antennas 338a, 338b. Each respective second antenna port 318 is coupled to the respective ASM 314, and is configured to be coupled to a respective second antenna 340 of second antennas 340a, 340b. Each respective SRS port 320 is coupled to the respective ASM 314, and is configured to be coupled to a corresponding SRS port on a corresponding PA module. For example, the SRS port 320a of the first PA module 302 is coupled to the SRS port 320b of the second PA module 304. Although in some examples a respective SRS port 320 may serve as both output and input to a respective PA module 302, 304, in other examples a separate SRS output and input port may be implemented.

Each respective first LNA 322 is switchably coupled to the respective first filter 310 at an input and is coupled to the respective MUX 326 at an output. Each respective second LNA 324 is coupled to the respective second filter 312 at an input and is coupled to the respective MUX 326 at an output. Each respective MUX 326 is coupled to the respective first LNA 322, the respective second LNA 324, and the four respective receive ports 328-334. Each respective MUX 326 is configured to switchably couple the respective first LNA 322 and/or the respective second LNA 324 to any of the four respective receive ports 328-334. Each respective first receive port 328 is coupled to the respective MUX 326 and is configured to be coupled to the transceiver 336. Each respective second receive port 330 is coupled to the respective MUX 326 and is configured to be coupled to the transceiver 336. Each respective third receive port 332 is coupled to the respective MUX 326 and is configured to be coupled to a corresponding third receive port on a corresponding PA module. For example, the third receive port 332a of the first PA module 302 is coupled to the third receive port 332b of the second PA module 304. Each respective fourth receive port 334 is coupled to the respective MUX 326 and is configured to be coupled to a corresponding fourth receive port on a corresponding PA module. For example, the fourth receive port 334a of the first PA module 302 is coupled to the fourth receive port 334b of the second PA module 304.

Accordingly, each respective MUX 326 enables any desired mapping from any of the respective antennas 338, 340 to a desired respective LNA 322, 324 and respective receive port 328-334. In examples in which the PA modules 302, 304 are coupled to one another via the third receive ports 332a, 332b and the fourth receive ports 334a, 334b, any of the respective LNAs 322, 324 of one of the PA modules 302, 304 may be routed to any of the receive ports 328-334 on the other one of the PA modules 304, 302. Such antenna swapping may enable one receive path to transition from being connected to a local antenna (for example, the first antenna 338a coupled to the first PA module 302) across the user equipment (UE) to the other PA module (for example, the second PA module 304) where the receive path may be connected to a remote active antenna (for example, the second antenna 340b coupled to the second PA module 304). Such antenna swapping may further enable the routing of the remote receive path that is nominally connected to the remote antenna to be connected across the UE to a swapped antenna (for example, the first antenna 338a)

Figure 4:
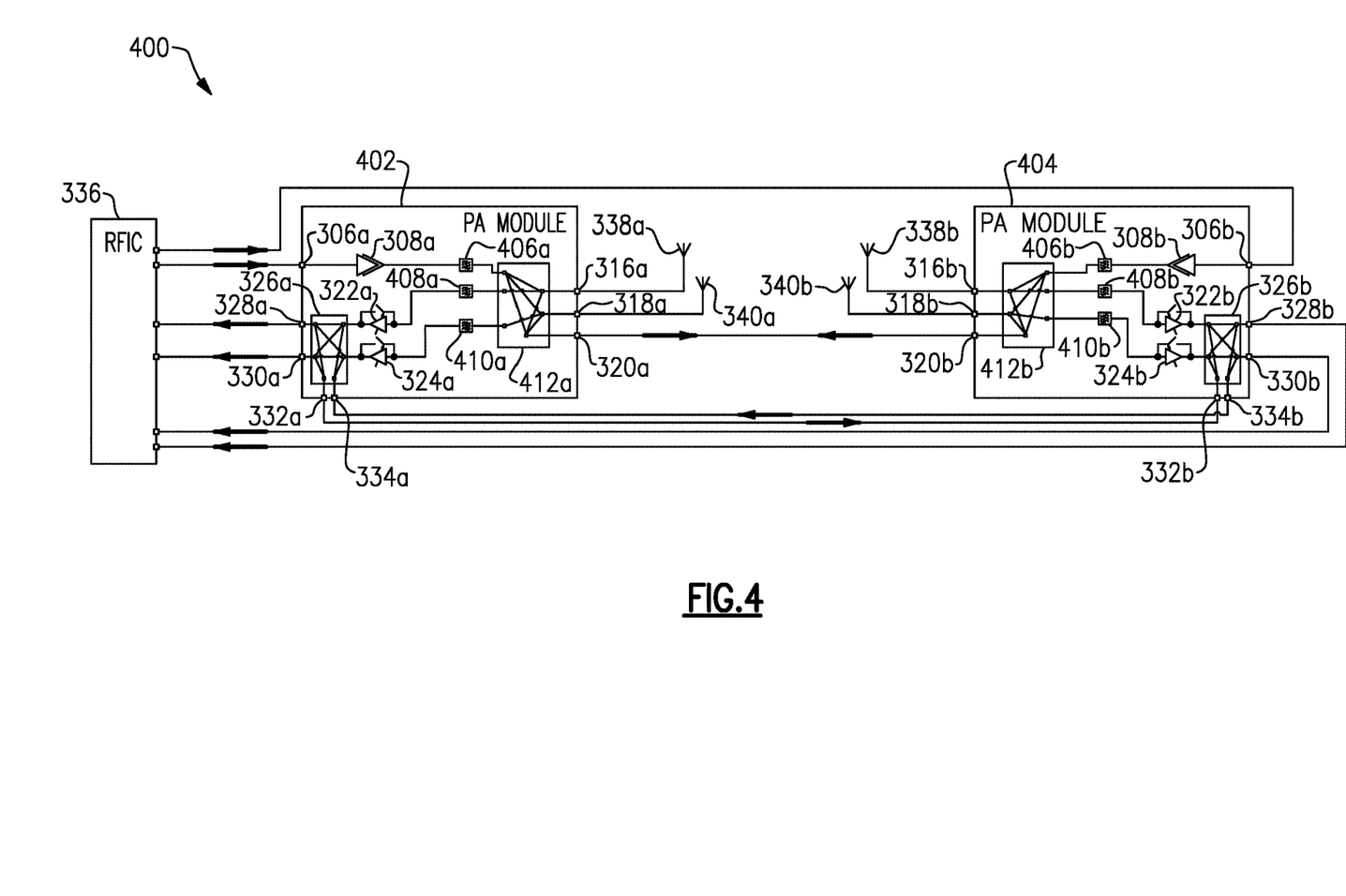
FIG. 4 illustrates a block diagram of a PA-module system according to another example.

FIG. 4 illustrates a block diagram of a PA-module system 400 according to another example. The PA-module system 400 includes a first PA module 402 and a second PA module 404 configured in a 2T4R configuration. The PA modules 402, 404 may be substantially similar to the PA modules 302, 304 illustrated in FIG. 3. However, whereas each of the PA modules 302, 304 of FIG. 3 include a respective second filter 312 that is common to, and switchably coupled to, the respective PA 308 and the respective first LNA, the PA modules 402, 404 of FIG. 4 do not include common filters. Rather, the PA modules 402, 404 of FIG. 4 include a respective first filter 406a, 406b, a respective second filter 408a, 408b, a respective third filter 410a, 410b, and a respective ASM 412a, 412b, respectively. Each respective first filter 406 is coupled between the respective PA 308 and the respective ASM 412. Each respective second filter 408 is coupled between the respective first LNA 322 and the respective ASM 412. Each respective third filter 410 is coupled between the respective second LNA 324 and the respective ASM 412. In various examples, the PA modules 402, 404 of FIG. 4 are otherwise substantially similar or identical to the PA modules of FIG. 3, and like components are labeled accordingly. That is, the principles discussed herein are not limited to specific filtering arrangements.

Figure 5:
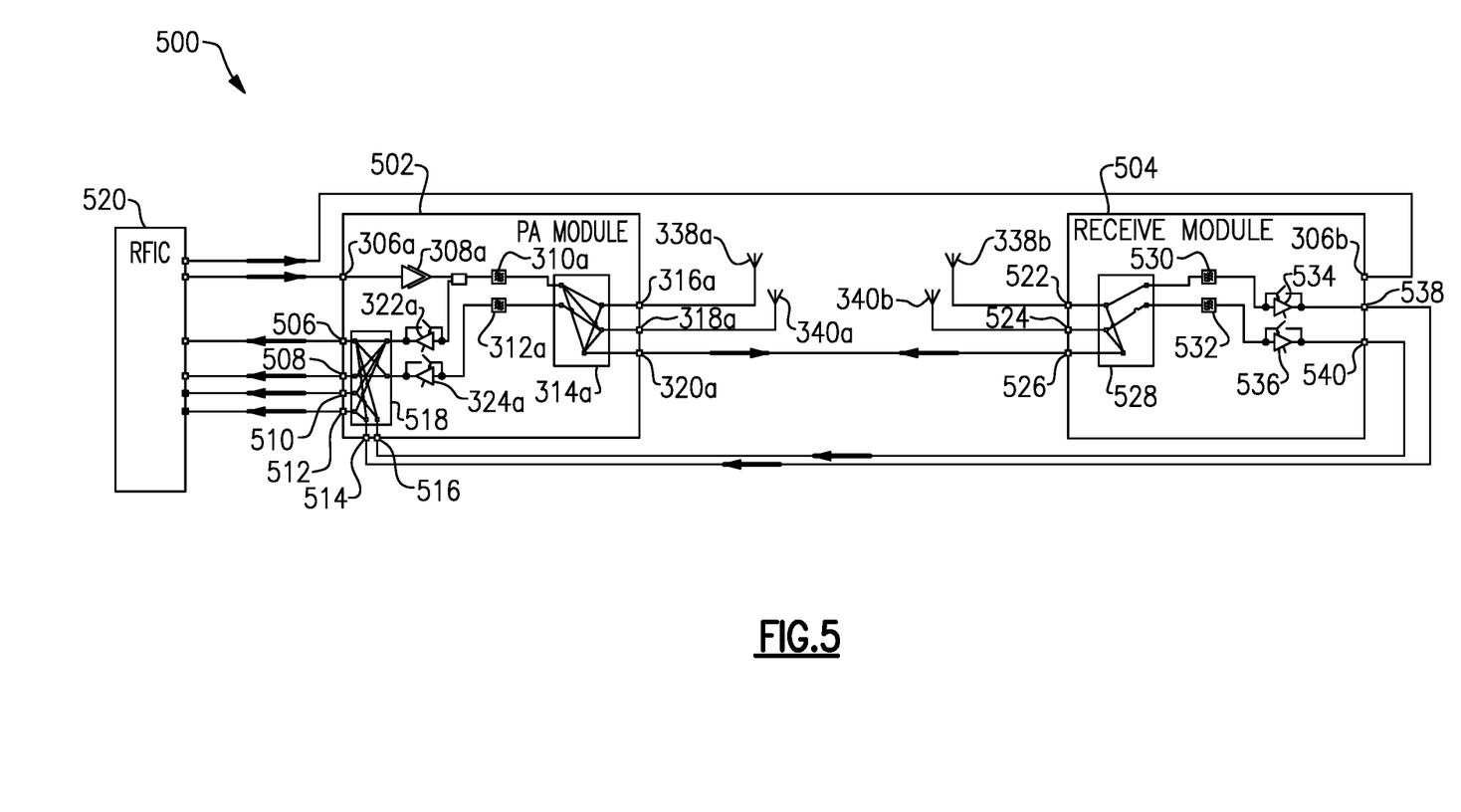
FIG. 5 illustrates a block diagram of a PA-module system according to another example.

FIG. 5 illustrates a block diagram of a PA-module system 500 according to another example. The PA-module system 500 includes a PA module 502 and a receive module 504 configured in a 1T4R configuration. The PA module 502 is substantially similar or identical to those illustrated in FIG. 3 and, for purposes of example, components of the PA module 502 are labeled with reference to the like components of the first PA module 302. However, whereas the first PA module 302 includes four receive ports 328a-334a, the PA module 502 of FIG. 5 has six receive ports including a first receive port 506, a second receive port 508, a third receive port 510, a fourth receive port 512, a fifth receive port 514, and a sixth receive port 516. Each of the receive ports 506-516 is coupled to a MUX 518. The receive ports 506-512 are configured to be coupled to a transceiver 520, and the remaining receive ports 514-516 are configured to be coupled to corresponding receive ports on the receive module 504. The receive module 504 is substantially similar to the PA module 502, but is configured only for receiving signals and does not include a transmit port, PA, or dedicated MUX. The term "remote module" may be used to refer to either a receive module, such as the receive module 504, or to a PA module external to (that is, remote from) a given PA module, such as the PA module 502. The receive module 504 includes a first antenna port 522, a second antenna port 524, an SRS port 526, an ASM 528, a first filter 530, a second filter 532, a first LNA 534, a second LNA 536, a first receive port 538, and a second receive port 540. The first receive port 538 is configured to be coupled to the fifth receive port 514 of the PA module 502, and the second receive port 540 is configured to be coupled to the sixth receive port 516 of the PA module 502. The receive ports 538, 540 of the receive module 504 are configured to provide received signals to the MUX 518 of the PA module 502 via the receive ports 516, 516 of the PA module 502.

Accordingly, various implementations of the PA module 200 of FIG. 2 are within the scope of the disclosure. In various examples, the MUX 208 (which may, for example, be implemented according to the design of any of the MUXes 326, 518, 528, or other implementations) may be controlled independently through registers dedicated to the MUX 208 which are separate from registers dedicated to the ASM 204. In some examples, certain basebands may only allow for one register (for example, the ASM 204 register) to be programmed for a swap function, in which case control of the MUX 208 may be tied to settings for the ASM 204 register. For example, the PA module(s) 200 may implement internal decoding that determines control of the MUX 208 based on the ASM 204 register settings. In some examples, such decoding may be performed in advance and triggered when desired by baseband-supplied software triggers. In various examples, certain baseband software platforms may write the ASM 204 register only during a transmit timeslot, and may not provide any register writes during the receive timeslot. In some of these examples, the PA module 200 may decode control instructions for the MUX 208 during the transmit timeslot, and implement latch-and-hold-type circuits to implement the controls at a later time (for example, during a receive timeslot).

Various controllers, such as a controller configured to control a state of the MUX 208 and/or the ASM 204, may execute various operations discussed above. Using data stored in associated memory and/or storage, the controller also executes one or more instructions stored on one or more non-transitory computer-readable media, which the controller may include and/or be coupled to, that may result in manipulated data. In some examples, the controller may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A front-end module comprising:
one or more receive ports configured to be coupled to a transceiver;
at least one low-noise amplifier configured to be coupled to the one or more receive ports;
a common filter coupled to a receive path and a transmit path of the front-end module;
one or more antenna ports configured to be coupled to one or more respective antennas; and
a multiplexer coupled to the one or more receive ports and to the one or more antenna ports, the multiplexer being configured to route a signal received at the one or more antenna ports to a selected receive port of the one or more receive ports through the common filter.

2. The front-end module of claim 1 wherein the front-end module is configured to operate in one or more of a time-division duplexing mode of operation or a frequency-division duplexing mode of operation.

3. The front-end module of claim 1 wherein the multiplexer is coupled to an output of the at least one low-noise amplifier.

4. The front-end module of claim 1 wherein a number of receive ports of the one or more receive ports is greater than a number of low-noise amplifiers of the at least one low-noise amplifier.

5. The front-end module of claim 4 wherein the at least one low-noise amplifier includes a plurality of low-noise amplifiers.

6. The front-end module of claim 1 wherein the at least one low-noise amplifier includes a plurality of low-noise amplifiers, the front-end module further comprising a plurality of filters each corresponding to a respective low-noise amplifier of the plurality of low-noise amplifiers.

7. The front-end module of claim 1 further comprising at least one remote-module receive port configured to be coupled to a remote module and configured to receive one or more signals from the remote module, wherein the multiplexer is further configured to route the one or more signals from the at least one remote-module receive port to the one or more receive ports coupled to the transceiver.

8. The front-end module of claim 1 wherein the transmit path includes a power amplifier coupled to the common filter.

9. The front-end module of claim 8 wherein the receive path includes the at least one low-noise amplifier coupled to the common filter.

10. The front-end module of claim 9 further comprising a receive filter, wherein the at least one low-noise amplifier includes a first low-noise amplifier and a second low-noise amplifier, the first low-noise amplifier being coupled to the common filter and the second low-noise amplifier being coupled to the receive filter.

11. The front-end module of claim 1 further comprising a first filter coupled to the transmit path and a second filter coupled to the receive path.

12. The front-end module of claim 1 wherein at least one of the one or more receive ports is coupled to a remote module, and wherein the multiplexer is further configured to route one or more signals from the at least one receive port to the remote module.

13. The front-end module of claim 12 further comprising the remote module, wherein the remote module is further configured to provide the one or more signals to the transceiver.

14. A front-end module comprising:
one or more receive ports configured to be coupled to a transceiver;
at least one low-noise amplifier configured to be coupled to the one or more receive ports;
one or more antenna ports configured to be coupled to one or more respective antennas;
at least one remote-module receive port configured to be coupled to a remote module and configured to receive one or more signals from the remote module; and
a multiplexer coupled to the one or more receive ports and to the one or more antenna ports, the multiplexer being configured to
route a signal received at the one or more antenna ports to a selected receive port of the one or more receive ports, and
route the one or more signals from the at least one remote-module receive port to the one or more receive ports coupled to the transceiver.

15. A method of operating an amplifier module having one or more receive ports, one or more antenna ports, an antenna switch module, a common filter coupled to a transmit path and a receive path, and a multiplexer, the method comprising:
receiving one or more receive signals at the one or more antenna ports;
routing, by the antenna switch module, the one or more receive signals to the multiplexer via the common filter and the receive path; and
routing, by the multiplexer, the one or more receive signals to a selected receive port of the one or more receive ports.

16. The method of claim 15 wherein the amplifier module includes one or more transmit ports and a power amplifier, the method further comprising:
receiving one or more transmit signals at the one or more transmit ports;
providing the one or more transmit signals to the power amplifier; and
providing, by the power amplifier, the one or more transmit signals to the antenna switch module via the transmit path, the transmit path being different than the receive path.

17. The method of claim 16 further comprising:
routing, by the antenna switch module, a first receive signal to the multiplexer via a first receive path; and
routing, by the antenna switch module, a second receive signal to the multiplexer via a second receive path, the first receive path and the second receive path being different than each other and the transmit path.

18. The method of claim 15 further comprising:
receiving, at a first receive port of the one or more receive ports, a receive signal from a remote module; and
routing, by the multiplexer, the receive signal to a transceiver via a second receive port of the one or more receive ports.

19. The method of claim 15 further comprising:
receiving a first receive signal at the one or more antenna ports;
routing, by the antenna switch module, the first receive signal to the multiplexer; and
routing, by the multiplexer, the first receive signal to a remote module via a selected receive port of the one or more receive ports.

20. The method of claim 19, further comprising:
receiving, by the remote module, the first receive signal; and
providing, by the remote module, the first receive signal to a transceiver.

* * * * *